United States Patent [19]

Filosa

[11] Patent Number: 4,844,016
[45] Date of Patent: Jul. 4, 1989

[54] PET ENCLOSURE

[76] Inventor: Michael Filosa, 37 Louis Dr., Melville, N.Y. 11747

[21] Appl. No.: 129,481

[22] Filed: Dec. 7, 1987

[51] Int. Cl.⁴ ............................................. A01K 1/02
[52] U.S. Cl. ................................................... 119/19
[58] Field of Search .................. 47/69; 119/1, 15, 19; 49/407, 449; 292/DIG. 21, DIG. 46

[56] References Cited

U.S. PATENT DOCUMENTS

| | | | |
|---|---|---|---|
| 95,255 | 9/1869 | Osborn | 47/69 X |
| 1,597,079 | 8/1926 | Kugley | 292/DIG. 46 X |
| 1,647,226 | 11/1927 | Hicks | 292/DIG. 46 X |
| 1,647,228 | 11/1927 | Hicks | 49/449 |
| 1,652,629 | 12/1927 | Markey | 119/19 |
| 2,715,794 | 8/1955 | Atkinson | 47/69 X |
| 3,152,574 | 10/1964 | Stout | 47/69 X |
| 3,524,431 | 8/1970 | Graham et al. | 119/19 |
| 3,583,738 | 6/1971 | Uphoff | 49/449 |
| 3,651,975 | 3/1972 | Callan | 47/69 X |
| 3,774,342 | 11/1973 | Thom | 49/449 X |
| 3,865,425 | 2/1975 | French | 119/19 X |
| 4,475,313 | 10/1984 | Governale | 49/449 X |
| 4,486,980 | 12/1984 | O'Bar | 49/449 |

FOREIGN PATENT DOCUMENTS

| | | | |
|---|---|---|---|
| 550176 | 12/1957 | Canada | 119/19 |
| 395397 | 7/1933 | United Kingdom | 119/19 |

Primary Examiner—Gene Mancene
Assistant Examiner—R. Thomas Price
Attorney, Agent, or Firm—Michael I. Kroll

[57] ABSTRACT

A pet enclosure is provided and consists of a frame, a bottom platform supported on the frame, side, front and rear transparent walls supported by the frame defining a receptacle for a pet and allowing the pet to view therefrom and anyone to view the pet therein, a perforated transparent cover on the frame for containment and venting, a transparent door disposed in the transparent front wall and a latch mechanism for holding the transparent door in a closed position.

4 Claims, 1 Drawing Sheet

U.S. Patent  Jul. 4, 1989  4,844,016
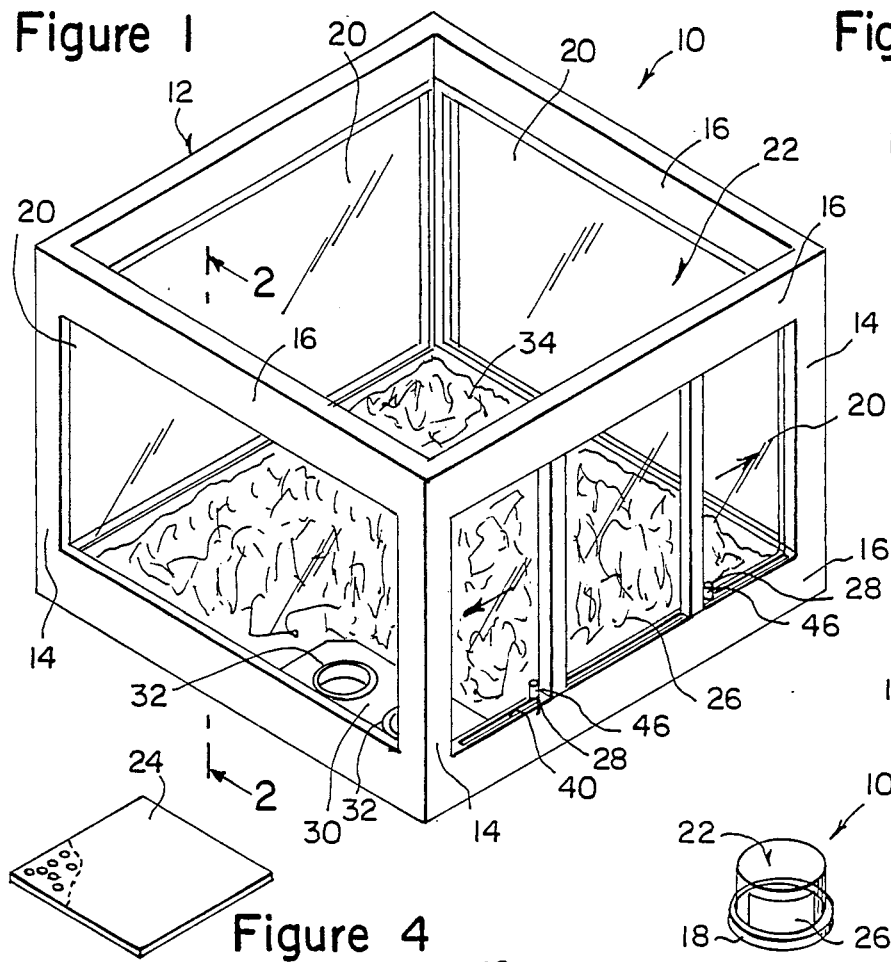
Figure 1
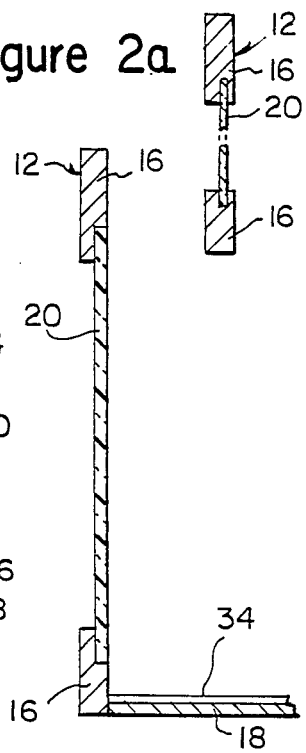
Figure 2a
Figure 2
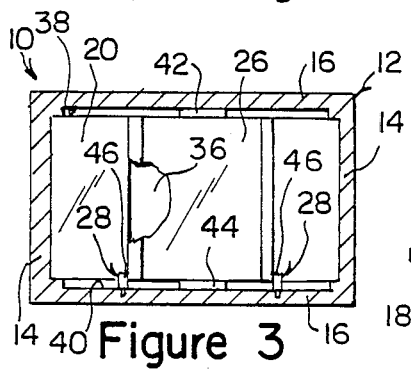
Figure 4
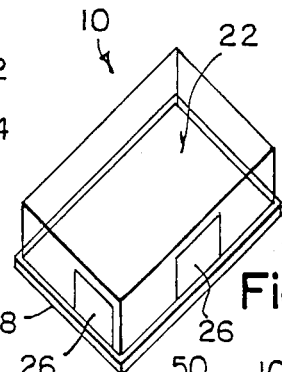
Figure 3
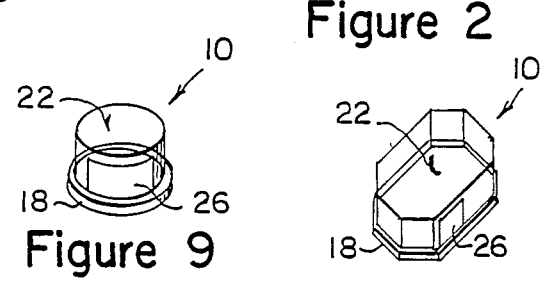
Figure 8  Figure 9  Figure 10
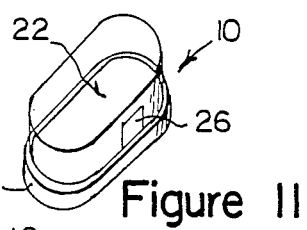
Figure 11
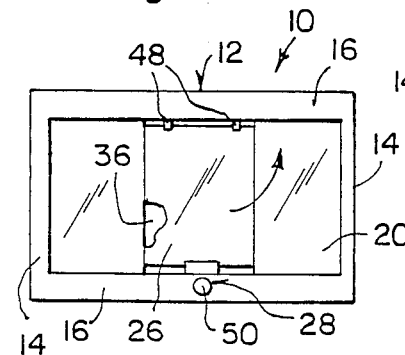
Figure 5
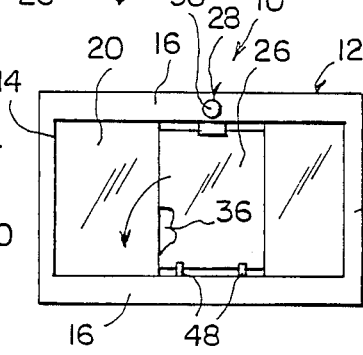
Figure 6
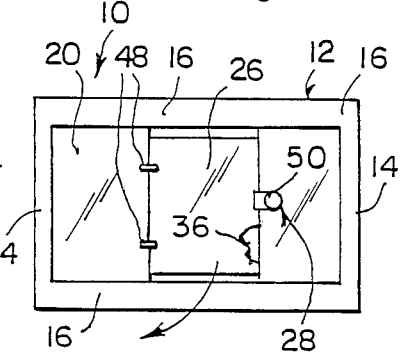
Figure 7

PET ENCLOSURE

BACKGROUND OF THE INVENTION

1. Field of the Invention

The instant invention relates generally to receptacles and more specifically it relates to a pet enclosure.

2. Description of the Prior Art

Numerous receptacles have been provided in prior art that are adapted to retain and display various animals and plant life. For example, U.S. Pat. Nos. 3,429,297; 4,210,100 and 4,475,480 all are illustrative of such prior art. While these units may be suitable for the particular purpose to which they address, they would not be as suitable for the purposes of the present invention as heretofore described.

SUMMARY OF THE INVENTION

A primary object of the present invention is to provide a pet enclosure that will overcome the shortcomings of the prior art devices.

Another object is to provide a pet enclosure that is a comfortable, secure and pleasant environment for a pet to stay in, permitting the pet to view its surroundings and activity so that the pet can therefore feel as though it is a part of that activity.

An additional object is to provide a pet enclosure which permits the pet owner to easily view the pet and its activities, thereby adding to the owners enjoyment of the pet.

A further object is to provide a pet enclosure that is simple and easy to use.

A still further object is to provide a pet enclosure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a cross sectional view taken along line 2—2 in FIG. 1.

FIG. 2a is a cross sectional view similar to FIG. 2 of another way of securing the transparent panel to the frame member.

FIG. 3 is a front view with the frame in section showing the sliding door and upper and lower tracks therein.

FIG. 4 is a perspective view of a preferred cover.

FIG. 5 is a front view of the invention showing the door hinged from the top.

FIG. 6 is a front view similar to FIG. 5 showing the door hinged from the bottom.

FIG. 7 is a front view similar to FIG. 5 showing the door hinged from the side.

FIG. 8 is a perspective view of the invention in a rectangular shape.

FIG. 9 is a perspective view of the invention in a circular shape.

FIG. 10 is a perspective view of the invention in a multi-sided shape.

FIG. 11 is a perspective view of the invention in an elliptical shape.

DETAILED DESCRIPTION OF THE PREFERRED EMBODIMENTS

Turning now descriptively to the drawings, in which similar reference characters denote similar elements throughout the several views, FIGS. 1 through 11 illustrates a pet enclosure 10 consisting of a frame 12 that has upright corner segments 14 integral with spaced substantially horizontal segments 16. A bottom platform 18 is secured to the frame 12 while side, front, and rear transparent walls 20 fabricated from glass, plexiglass, plastic, etc. are also secured to the frame 12 defining a receptacle 22 for a pet (not shown) such as a dog, cat, etc., allowing the pet to view therefrom and anyone to view the pet therein. A perforated removable cover 24, such as made from mesh, bars, screen, plastic with apertures, etc. is disposed onto top of the frame 12 for venting. The cover 24 can be a moon roof or sliding top type affixed or secured to the frame 12 of the enclosure 10 if so desired. A transparent door 26, fabricated out of the same material as the walls 20 is disposed at the transparent front wall 20 to allow for access into the receptacle 22 and a device 28 is provided for holding the transparent door 26 in a closed position.

A feeder 30 being either permanent or removable is placed into the receptable 22 onto the bottom platform 18. The feeder 30 has two dishes 32 therein, one dish 32 is for water and other disk 32 is for solid foods for feeding the pet. A floor covering 34 being pile carpet, linoleum, etc., is placed into the receptacle 22 onto the bottom platform 18 for protecting the bottom platform 18 from spilled water, food and waste from the pet.

As shown in FIGS. 1 and 3 the front transparent wall 20 has a cut out area 36 between the upper and lower front horizontal segments 16 of the frame 12. The upper front horizontal segment 16 has an elongated upper track 38 formed in lower edge thereof. The lower front horizontal segment 16 has an elongated lower track 40 formed in upper edge thereof. The transparent door 26 is a slideable door that has an upper guide member 42 and a lower guide member 44 so as to travel within the upper and lower tracks 38 and 40 in the frame 12. The holding device 28 consists of two pins 46, each fitting into the lower track 40 on each side of the transparent door 26 to prevent the pet from moving the transparent door 26 away from the cut out area 36 in the front transparent wall 20 in the event that the owner wishes the pet to remain in the enclosure. Removal of the pins 46 permits the door 26 to be opened to allow the pet free egress and access if the owner so desires.

A first modified door 26 is shown in FIGS. 5 and 6. The front transparent wall 20 has the same cut out area 36 between the upper and lower front horizontal segments 16 of the frame 12. The transparent door 26 is a swing away door and is approximately the same size as the cut out area 36 in the front transparent wall 20. A pair of hinges 48 are connected to one edge of one of the front horizontal segments 16 of the frame 12 and one edge of the transparent door 26 so as to allow the transparent door 26 to swing away from the front transparent wall 20. The holding device 28 is a latch mechanism 50 connected between one edge of one of the front horizontal segments 16 of the frame and one edge of the transparent door 26 opposite the hinges 48 to prevent the pet from opening the transparent door 26.

A second modified door 26 is shown in FIG. 7. The front transparent wall 20 also has the same cut out area 36 between the upper and lower front horizontal segments 16 of the frame 12. The transparent door 26 is also a swing away door and is approximately the same size as the cut out area 36 in the front transparent wall 20. The pair of hinges 48 are connected to one edge of the cut out area 36 of the front transparent wall 20 and one edge of the transparent door 26 so as to allow the transparent door 26 to swing away from the front transparent wall 20. The holding device 28 is also the latch mechanism 50 connected between one edge of the cut out area 36 of the front transparent wall 20 and one edge of the transparent door 26 opposite the hinges 48 to prevent the pet from opening the transparent door 26. Optionally, the pet enclosure 10 can come without the transparent door 26 whereby the pet can be placed into and removed from receptacle 22 through the top of the frame 12 when removing the cover 24.

FIGS. 8 through 11 show the pet enclosure 10 modified into different geometric shapes such as rectangular, circular, multi-sided and elliptical.

The pet enclosure 10 provides a permanent home within a home that the pet can feel is his own and encourages house-breaking. New puppies, for example, do not want to soil the area in which they eat or sleep. By being confined by this invention, therefrom they would tend and try to hold it in until taken outdoors.

As the pet enclosure 10 can be made to match any interior decor styling and color scheme, it can be kept in any part of a house or apartment, as well as outdoors, if desired. Its design and appearance is such that it is not offensive or obtrusive, quite to the contrary, it is a very pleasant looking device which would blend in well with any surroudings. Thus, the pet need not be kept apart from its human family but can be part of it while yet remaining in the pet closure 10 under control as opposed to being under foot.

The pet enclosure 10 can be used to confine the pet while no one is at home, even after pet is house-broken, thereby preventing possible damage to furniture and other household or personal items if the pet is disposed to chewing, scratching, clawing, romping, etc. while no one is at home to look after it. Further, while confining the pet to this comfortable, secure pet enclosure 10 while no one is at home, ther is far less likelihood for the pet to accidentally hurt or harm itself. It also provides a convenient way to confine a pet in the event of visitors, whether planned or unplanned, as pets tend to get excited under such circumstances and can become a nuisance to owners and visitors alike.

The invention can be a convenient way to keep the house or apartment and furnishings from getting soiled if the pet was outside under adverse weather conditions such as rain or snow. Upon entering the house under such circumstances, the pet could be placed in the comfortable pet enclosure 10 until dry. If it shook the precipitation from its body, as dogs and puppies are prone to doing when they get wet, by being in the pet enclosure 10, the effects of the pets conduct would be confined to the pet enclosure 10 and therefore would not impact the home. The same would apply for wet or muddy paws.

It will be understood that each of the elements described about, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed as new and desired to be protected by Letters Patent is set forth in the appended claims.

1. A pet enclosure which comprises:
   (a) a bottom platform that is placed upon a flat surface;
   (b) side, front and rear transparent walls supported on said bottom platform defining a receptacle for a pet and allowing the pet to view therefrom and anyone to view the pet therein;
   (c) a perforated transparent cover disposed on top of the receptacle for containment of the pet, yet allowing for adequate ventilation;
   (d) a single sliding transparent door disposed at said transparent front wall to allow for access into and egress out of the receptacle;
   (e) means for holding said transparent door in a closed position; and
   (f) a frame having upright corner segments integral with spaced substantially horizontal segments which secure thereto said bottom platform, said side, front and rear transparent walls and said cover, said front transparent wall having a cut out area between the upper and lower front horizontal segments of said frame, the upper front horizontal segment having an elongated upper track formed in a lower edge thereof, the lower front horizontal segment having an elongated lower track formed in an upper edge thereof, said single sliding transparent door having an upper guide member and a lower guide member so as to travel within the upper and lower tracks in said frame, said holding means being two pins each fitting into the lower track on each side of said single sliding transparent door to prevent the pet from moving said single sliding transparent door away from the cut out area in said front transparent wall in the event the owner wishes the pet to remain in said enclosure, removal of said pins permitting said single sliding transparent door to be opened to allow the pet free egress and access if the owner so desires.

2. A pet enclosure as recited in claim 1, further comprising:
   (a) a feeder placed into the receptacle onto said bottom platform, said feeder having two dishes therein, one of the dishes for water and other of the dishes for solid foods for feeding the pet; and
   (b) a floor covering placed into the receptacle onto said bottom platform for protecting said bottom platform from spilled water, food and waste from the pet.

3. A pet enclosure as recited in claim 2, further comprising:
   (a) said front transparent wall having a cut out area between the upper and lower front horizontal segments of said frame;
   (b) said transparent door being a swing away door and approximately same size as the cut out area in said front transparent wall;

(c) a pair of hinges connected to one edge of one of the front horizontal segments of said frame and one edge of said transparent door so as to allow said transparent door to swing away from said front transparent wall; and (d) said holding means being a latch mechanism connected between one edge of one of the front horizontal segments of said frame and one edge of said transparent door opposite said hinges to prevent the pet from opening said transparent door.

4. a pet enclosure as recited in claim 2, further comprising:

(a) said front transparent wall having a cut out area between the upper and lower front horizontal segments of said frame;

(b) said transparent door being a swing away door and approximately same size as the cut out area in said front transparent wall;

(c) a pair of hinges connected to one edge of the cut out area of said front transparent wall and one edge of said transparent door so as to allow said transparent door to swing away from said front transparent wall; and (d) said holding means being a latch mechanism connected between one edge of the cut out area of said front transparent wall and one edge of said transparent door opposite said hinges to prevent the pet from opening said transparent door.

* * * * *